United States Patent Office 2,740,734
Patented Apr. 3, 1956

2,740,734

METHODS FOR CLEANING FOOD CONTAINERS AND THE LIKE

Clarence F. Dinley, Jr., and Ira J. Duncan, Detroit, Mich., assignors to Detrex Corporation, Detroit, Mich., a corporation of Michigan No Drawing. Application October 11, 1949,
Serial No. 120,818

6 Claims. (Cl. 134—29)

This invention relates to the cleaning and surface preparation of utensils, and more particularly relates to methods for cleaning carbonized and grease-carbon incrustations from bread-baking pans and the like.

In the baking art, it has been found advantageous in separating a unit of baked or cooked product from a baking container to coat the inner surface of the container with grease or oils and the like and/or with other pan coating compositions prior to baking. The coating composition provides an intermediate film between the utensil or between the permanent coating and the baked or cooked article, facilitating the eventual removal of the baked or cooked article from the container. However, on such removal of foodstuffs and the like there is left on the utensil surface or on the permanent coating surface an undesirable accumulation consisting of grease, oils and carbonized materials and foodstuff particles in the form of either a continuous adherent layer or as crumbs and lumps or pieces, particularly in the corners, interstices and folds of the utensil.

In normal baking practice, the coated utensil is often recoated regularly and re-used several times with resultant accumulation of relatively thick and undesirable incrustations on the containing utensil. This reuse is often necessitated because of the considerable amount of time consumed in the container cleaning processes of the prior art. Since the accumulation of thick incrustations interferes with heat transfer through the bake pan or utensil and into the bread dough, an increased oven temperature and baking or cooking is necessary and the efficient life of the average bread pan or utensil is materially shortened. The repeated heating of organic residues present in accumulated incrustations also results in decomposition of oils present in the incrustations with formation of organic acids which undesirably attack the tin surface of the usual tinned utensil and aluminized surface of the usual aluminum utensils. The organic acids are formed as a result of the inability of known procedures and compositions to remove incrustations completely even though the pans are cleaned regularly. Moreover, due to the time-consuming nature of the cleaning processes of the prior art, bakers and other food manufacturers have almost universally found it necessary to clean only a small percent of their utensils at a time while the others remain in service. This has the disadvantage that different utensils having different thicknesses of accumulated incrustations are present in a common oven, with resultant lack of uniformity of crust color and oven spring of the baked product. It has the further disadvantage that the regular maintenance of a standardized utensil cleaning schedule is not conveniently feasible in actual practice, with resultant difficulty in setting up a daily work assignment for attaining measurable productivity. Further, the food plant has often attempted to speed up utensil cleaning by resorting to strong, caustic-like compositions. This procedure often leads to removal of the pan surface. In the case of tinned utensils the tin thickness is only 1 ml. thick, and aluminized utensils carry only 10 mls. thickness of aluminum, so great danger to utensil life exists when recourse to strong cleaners is made. To still further show the old cleaning methods, present compounds have a noticeable tendency to leave powdery residues of unrinsed powders on the baking surface. These undesirable residues cause two kinds of difficulties at present:

(1) If the unrinsed residues are not removed by individual hand wiping, then a definite toxic potential exists, since some of the residues would likely be reduced to chromium salts.

(2) If the unrinsed residues are removed by hand wiping, then labor costs soar still higher and the steel wool and instruments that are used are detrimental to the tin, aluminum or permanent resin surface.

Special purpose coatings have been formulated for use in the baking art as substitutes for grease. While some of these special purpose coatings, such as the silicone resins, are heat-resistant to a considerable extent, they decompose to some extent and do not entirely prevent the formation of incrustations on the inner surfaces and outside straps of baking utensils. Moreover, many of these special purpose coatings require a clean, deposit-free surface in order to attain good adherence of the coating to the surface of the baking utensil. The slow cleaning methods of the prior art materially limit the application of the silicone resins and other pan coating compositions for this reason. To the best of our knowledge, the prior art does not disclose any fast and effective method for removing food incrustations from utensils with desirable rapidity without damaging the metallic or other surfaces of such cooking and baking utensils.

In the cleaning of utensils according to procedures of the prior art, it has been customary to stack the utensils back to back or face to face and to immerse the stacked utensils in a utensil cleaning solution. Following the immersion step, the individual utensils are usually brushed by hand to remove residual incrustations and soil from corners of the utensils and are then immersed in a still water rinsing bath. The face to face or back to back stacking formation has a disadvantage in that a relatively large volume of cleaning solution is required per utensil cleaned. The hand-brushing step is also objectionable in that it involves excessive labor costs and considerably lengthens the cleaning and unit labor hours period per utensil. The cleaning cycle is further lengthened by the time consumed in subjecting the utensil to a still water rinse.

It is an object of this invention to provide a process for the rapid removal of incrustations from utensils. It is a further object of our invention to provide compositions and methods for cleaning carbonized dough and oils and other incrustations from baking utensils. Still another object of the invention is to provide a method for complete removal of deposits from utensil surfaces without requiring hand brushing. Another object is to provide a method for removal of incrustations from the surfaces of a multiplicity of utensils while closely stacked in nested form. It is a further object of the invention to provide a rapid method for rinsing previously separated accumulations from the utensils. Finally, it is an object to provide a method of cleaning and surface preparation that effectively eliminates the toxic potential inherent in the prior art.

The first step in the present process consists in subjecting the materials adhering to the utensil to the solvent cleaning action of a chlorinated hydrocarbon degreasing solvent of the chlorinated ethylene type such as trichlorethylene or perchlorethylene, or in any way to remove the oil portion of the soil prior to the removing of the oil insoluble portion or any other preliminary treatment. The initial conditioning step of our process is conveniently accomplished by suitably exposing the utensils to be cleaned to the action of the heated vapors of such solvent. This can be done while they are stacked in nested form. In this way a penetration of the incrustation is achieved as the solvent is carried not only through the pores of the incrustation but also into the beads, laps, folds, and pores of the metal itself. Immersing the utensils in hot or cold liquid solvent or using a combination of both vapor and liquid cleaning is also effective. However, for overall efficiency and best results we prefer to use vapor cleaning. The utensil is then immersed in a boiling aqueous solution of a selected inhibited cleaning composition or preferably is immersed in a solution of our new alkali cleaning composition as hereinafter described. Suitable alkali cleaning compositions include aqueous solutions of alkali metal carbonates, soaps, borax, caustic alkalis, alkali metal silicates, alkali metal sesquicarbonates, alkali metal phosphates and like alkali cleaning compositions, but we particularly prefer our new composition which is referred to hereinafter. After immersion for about one hour the utensils are subjected to a pressure rinse using jets of hot or cold water after which they are dried. They are then ready for the application of grease or other coating preparatory to re-use.

The aforementioned drying step may be carried out by allowing the pans to stand at room temperature or at elevated temperature in a suitable dryer. However, it is preferred to recycle the rinsed utensils through the original degreasing machine or to conduct them through a similar machine suitably fitted out for drying in order to remove residual moisture with attendant saving in cost and space requirements of equipment.

The cleaning composition referred to in the second step of the process outlined above consists of a mixture of an alkali metal tripolyphosphate, an alkali metal carbonate, an alkali metal phosphate, and an alkali metal chromate. To this mixture we prefer to add a suitable wetting agent, although this is not an essential ingredient of the compositions of our invention. The term "tripolyphosphate" as applied to an ingredient of our composition defines the alkaline polyphosphates having three atoms of phosphorous per ion. Among the alkali metal tripolyphosphates is sodium tripolyphosphate which is conventionally represented by the formula $Na_5P_3O_{10}$. The alkali metal carbonates described herein consist of the carbonates of sodium, potassium, lithium, and equivalent carbonates and alkaline carbonate mixtures. Our alkali metal phosphates comprise the well known orthophosphates of the alkali metals, their mixtures, and alkaline equivalents thereof. The chromates referred to herein consist of the ordinary chromate ion $(CrO_4^{-2})$ in alkaline solution in combination with an alkali metal ion, mixtures thereof, or the equivalent.

While the proportions of the aforementioned ingredients in the chemical combination as a whole are subject to considerable variation within the ranges indicated, the composition should contain a major proportion (at least 40%) of alkali metal phosphate together with relatively smaller but substantial proportions of compatible alkali metal carbonate, tripolyphosphate, and chromate. The composition may also contain a minor proportion of a compatible wetting agent, but should be substantially free of any other material or at least should be limited to minor proportions of other materials. Preferred proportions of ingredients of our compositions are as follows:

| | Percent by weight |
|---|---|
| Alkali metal tripolyphosphate | 10–20 |
| Alkali metal carbonate | 10–20 |
| Alkali metal phosphate | 40–70 |
| Alkali metal chromate | 5–15 |
| Wetting agent | 0–5 |

The composition listed above is particularly suitable in our process when cleaning grease carbon soils from tinned utensils. However, this process is universally adapted to all bakery utensils. A particularly preferred embodiment of our invention consists of the following ingredients in substantially the amounts indicated:

| | Parts by weight |
|---|---|
| Sodium tripolyphosphate | 18 |
| Sodium carbonate | 14 |
| Tri sodium phosphate | 61 |
| Sodium chromate | 7 |

The preferred strength of a boiling aqueous solution of our composition is ⅛ to 8 ounces of our composition to one gallon of water. However, our tin cleaning compound is inhibited against attacking tin and tin oxide baking film and higher concentrations may be used safely.

The wetting agent referred to above may be any one of the aryl-alkyl sulfonate type but for optimum results we prefer to use the wetting agent known commercially as "Nacconal" which contains compounds having substantially the formula $C_{11-14}H_{14-17}(C_6H_4)SO_3Na$, or the composition known as "Santomerse" which corresponds approximately to the formula $C_{12}H_{25}(C_6H_4)SO_3Na$.

The compositions of our invention are effective cleaners and do not corrode tinned metal utensils and aluminum pans including containers having tin-plated surfaces to any appreciable extent.

By practicing our novel process, we are able to accomplish excellent cleaning of encrusted containers in less time than the period required by straight alkali cleaning and other methods known to the art. Further our novel process makes more efficient utilization of boil tank space with an overall effective production of over 200 to 300% over present known methods. Further, since we remove oils plus some amounts of carbon and protein soils the boil tank solution is not called upon to remove these soils, so the solution lasts over 200% longer.

Under the procedures of the prior art, the bake pan is immersed in a soak tank containing a strong alkali. The alkali slowly attacks the soil and floats off the incrustations layer by layer, removing the entire thickness of the dense incrustation only after several hours of treatment. Our new process is directed to a preliminary conditioning operation which not only changes the chemical and physical nature of the incrustation but also alters the adhesive bond. This fundamental change is followed by a cleaning step by means of a chemical composition particularly adapted to penetrate and remove the incrustation in its modified form (or sponge residue) as attained by the chlorinated ethylene conditioning operation. The initial operation in addition to changing the chemical composition of the incrustation, making the altered layer more vulnerable to attack by the cleaning solution, also leaves it in a porous or spongy physical condition, exposing a greatly increased surface area to the subsequent action of the cleaning solution and reducing the required cleaning time to a fraction of the time heretofore required. We believe that this is brought about, at least in part, by the preliminary removal of oils, fats and greases and moisture from the pores of the encrusted grease carbonaceous material and from the pores of the metal. The porous, sponge-like layer which remains is easily penetrated by the alkali cleaner employed in the second stage of the process and has been changed so that the cohesive portions of the soil articles and the adhesive portions binding the soil to the base material are penetrated and destroyed by the alkali cleaner composition. Consequently, the altered layer is easily removed from the surface after a relatively limited treatment.

The preliminary degreasing step of our invention lengthens the life of the subsequently applied alkali cleaning solution inasmuch as the chlorinated ethylene solvent not only removes all solvent-soluble soil from the deposit but also removes an unexpected amount of solvent-insoluble soil from the utensil. This not only results in preliminary removal of objectionable acids which deplete the alkali cleaning solution but reduces operating costs generally since the degreasing solvent may be separated and reclaimed from the extracted soils for re-use while this is not commercially feasible in the case of depleted alkalies in water solution.

The combination of our preliminary chlorinated hydrocarbon or pre-conditioning step followed by cleaning with alkali cleaning chemicals of the prior art provides improved cleaning and constitutes a significant technical and practical advance over the art. However, further unexpected cleaning rapidity is obtained when the encrusted utensil is first treated with a chlorinated hydrocarbon for a time sufficient to modify the chemical and physical nature of the deposit, followed by alkali cleaning in contact with our new cleaning composition.

Our new composition is entirely different from the prior art compositions such as those mentioned in the U. S. patent to Kochs (No. 1,962,821) in that sodium silicate is not a required ingredient of our composition which contains an alkali metal tripolyphosphate and attains more desirable, rapid and efficient cleaning in connection with the process described herein than any prior art composition known to applicants.

It will be appreciated that our invention is not limited in application to the cleaning of bread baking pans or utensils and is applicable equally for purposes of cleaning food utensils in general, including tinned, aluminum, aluminized and other utensils which may be of the type which are conventionally burned out as in the baking industry or of the type which are not burned out, as in the meat packing industry and other industries.

Having thus described our invention, we claim:

1. A process for removing baked food incrustations from the surface of a baking container, such incrustations containing oily material and oil-insoluble material, comprising extracting said oily material from the incrustations by contacting said incrustations with hot chlorinated ethylene vapors for a sufficient time to effect a penetration and modification thereof, contacting said modified incrustations with a 10%–20% by weight hot aqueous alkali metal tripolyphosphate cleaning solution for a time sufficient to penetrate and destroy the adhesive portions of said modified incrustations and then subjecting the incrustations remaining to the action of water under pressure thereby completing the removal thereof.

2. The invention of claim 1 characterized by the fact that said hot vapors consist of trichlorethylene.

3. The invention of claim 1 characterized by the fact that said hot vapors consist of perchlorethylene.

4. In a method of removing cooked incrustations from a cooking container, said incrustations consisting essentially of relatively thick layers of carbonized material including oily materials and being adhesively affixed to the cooking container, the steps which comprise contacting the incrustation with a chlorinated ethylene for an extended time to extract oily material from the incrustation converting it to a porous, spongy layer, and subsequently contacting the porous spongy layer with a 10%–20% by weight hot alkali metal tripolyphosphate cleaning solution which readily penetrates the porous spongy layer to attack the adhesive bond, thereby decomposing the adhesive bond and freeing the incrustation bodily from the cooking container.

5. A process for removal of incrustations on baking containers containing organic residues and carbonaceous deposits, comprising contacting the incrustation with a chlorinated ethylene until the organic residues are partially removed and the chemical and physical nature of the incrustation is modified, and subsequently contacting the modified residue with an aqueous solution of the composition comprising by weight approximately 10–20% alkali metal carbonate, 40–70% alkali metal orthophosphates, 10–20% alkali metal tripolyphosphate, and 5–15% alkali metal chromate.

6. In a method for removing grease and carbonaceous incrustations from a baking container, the steps which comprise contacting said incrustations with the vapors of a boiling chlorinated ethylene solvent to effect removal of said grease and penetrate and modify said incrustation physically, and contacting the modified incrustation with a hot aqueous solution containing ⅛ to 8 ounces per gallon of water of the composition comprising by weight approximately 10–20% alkali metal carbonate, 40–70% alkali metal orthophosphate, 10–20% alkali metal tripolyphosphate, and 5–15% alkali metal chromate.

References Cited in the file of this patent

UNITED STATES PATENTS

| | | |
|---|---|---|
| 1,962,821 | Kochs | June 12, 1934 |
| 2,057,177 | Wolff | Oct. 13, 1936 |
| 2,101,012 | Pond | Nov. 30, 1937 |
| 2,113,129 | Dinley | Apr. 5, 1938 |
| 2,365,190 | Hatch | Dec. 19, 1944 |
| 2,371,645 | Aitchison | Mar. 20, 1945 |
| 2,371,646 | Petering | Mar. 20, 1945 |
| 2,382,165 | MacMahon | Aug. 14, 1945 |
| 2,435,453 | MacMahon | Feb. 3, 1948 |